United States Patent
Wheelwright et al.

(10) Patent No.: US 10,620,432 B1
(45) Date of Patent: Apr. 14, 2020

(54) DEVICES AND METHODS FOR LENS POSITION ADJUSTMENT BASED ON DIFFRACTION IN A FRESNEL LENS

(71) Applicant: Facebook Technologies, LLC, Menlo Park, CA (US)

(72) Inventors: Brian Wheelwright, Sammamish, WA (US); Jacques Gollier, Redmond, WA (US); Melissa Geng, Sammamish, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 4 days.

(21) Appl. No.: 15/497,079

(22) Filed: Apr. 25, 2017

(51) Int. Cl.
   *G02B 27/01* (2006.01)
   *G02B 3/08* (2006.01)

(52) U.S. Cl.
   CPC ........... *G02B 27/0101* (2013.01); *G02B 3/08* (2013.01); *G02B 27/01* (2013.01); *B60K 2370/334* (2019.05)

(58) Field of Classification Search
   CPC .... G02B 27/01; G02B 27/0101; G02B 27/32; G02B 27/34; G02B 27/35; G02B 2027/0118; G02B 2027/012; G02B 2027/0121; G02B 2027/0154; G02B 2027/0159; G02B 2027/0161; G02B 2027/0163; G02B 7/04; G02B 7/06; G02B 7/08; G02B 7/09
   USPC .................................................. 359/630–633
   See application file for complete search history.

(56) References Cited

U.S. PATENT DOCUMENTS

| | | | | |
|---|---|---|---|---|
| 3,758,201 A | * | 9/1973 | MacNeille | A61B 3/02 351/232 |
| 4,671,625 A | * | 6/1987 | Noble | G02B 27/2292 359/478 |
| 4,744,633 A | * | 5/1988 | Sheiman | G02B 27/26 351/201 |
| 5,347,400 A | * | 9/1994 | Hunter | G02B 3/08 345/7 |

(Continued)

FOREIGN PATENT DOCUMENTS

| WO | WO2017050975 A1 | 3/2017 | |
|---|---|---|---|
| WO | WO-2018158347 A1 * | 9/2018 | ......... G02B 27/0172 |

OTHER PUBLICATIONS

Wheelwright, Office Action, U.S. Appl. No. 15/497,083, dated Jan. 28, 2019, 22 pgs.

(Continued)

*Primary Examiner* — Nicholas R. Pasko
(74) *Attorney, Agent, or Firm* — Morgan, Lewis & Bockius LLP

(57) ABSTRACT

A method includes displaying a high contrast image on a display screen; and projecting the high contrast image through a Fresnel lens to provide a cue for adjusting a position of the Fresnel lens. Also disclosed is a device for determining and/or adjusting an offset of a Fresnel lens. The device includes a Fresnel lens and a display screen configured to project a high contrast image through the Fresnel lens. Further disclosed is a method for adjusting a position of a Fresnel lens. The method includes receiving a projection of a high contrast image transmitted through a Fresnel lens; and adjusting a position of the Fresnel lens based on the projection of the high contrast image.

14 Claims, 14 Drawing Sheets

(56) References Cited

U.S. PATENT DOCUMENTS

| | | | | |
|---|---|---|---|---|
| 5,622,417 | A * | 4/1997 | Conner | G03B 21/132 |
| | | | | 348/E5.141 |
| 6,760,169 | B2 * | 7/2004 | Takahashi | G02B 5/04 |
| | | | | 359/631 |
| 7,841,715 | B1 * | 11/2010 | Morrison | G02C 7/081 |
| | | | | 351/159.48 |
| 7,982,688 | B2 * | 7/2011 | Lind | G02B 27/0101 |
| | | | | 345/8 |
| 8,523,366 | B2 * | 9/2013 | Takahashi | H04N 9/3182 |
| | | | | 348/177 |
| 9,298,012 | B2 * | 3/2016 | Bohn | G02B 27/2242 |
| 2006/0072206 | A1 * | 4/2006 | Tsuyuki | G02B 27/0172 |
| | | | | 359/631 |
| 2007/0279911 | A1 | 12/2007 | Kitelmann et al. | |
| 2010/0073579 | A1 * | 3/2010 | Okada | G02B 27/0101 |
| | | | | 348/744 |
| 2011/0030765 | A1 | 2/2011 | Yang | |
| 2012/0162764 | A1 * | 6/2012 | Shimizu | G02B 7/12 |
| | | | | 359/473 |
| 2016/0070103 | A1 * | 3/2016 | Yoon | G02B 3/08 |
| | | | | 345/633 |
| 2016/0131900 | A1 * | 5/2016 | Pretorius | G02B 21/02 |
| | | | | 359/368 |
| 2017/0212361 | A1 * | 7/2017 | Staton | G02B 27/40 |
| 2018/0261146 | A1 * | 9/2018 | Van 'T Hooft | G02B 27/0172 |

OTHER PUBLICATIONS

Wheelwright, Final Office Action, U.S. Appl. No. 15/497,083, dated Jun. 12, 2019, 26 pgs.

Wheelwright, Notice of Allowance, U.S. Appl. No. 15/497,083, dated Sep. 3, 2019, 11 pgs.

* cited by examiner

DEVICES AND METHODS FOR LENS POSITION ADJUSTMENT BASED ON DIFFRACTION IN A FRESNEL LENS

RELATED APPLICATION

This application is related to U.S. patent application Ser. No. 15/497,083, entitled "Light Scattering Element for Providing Optical Cues for Lens Position Adjustment" filed Apr. 25, 2017, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to user. Different users can have different interpupillary distances, and it is important to set up a head-mounted display device for the correct interpupillary distance of a user, as an incorrect interpupillary distance can cause visual distortion.

However, determining an accurate interpupillary distance has often required professional assistance (e.g., a measurement by an optician). In the absence of such professional assistance, users often set up display devices for incorrect interpupillary distances, which reduces the user experience with such devices.

SUMMARY

Accordingly, there is a need for an improved method and an improved device for adjusting an interpupillary distance, thereby improving the user experience with display devices.

The above deficiencies and other problems are reduced or eliminated by the disclosed devices and methods.

In accordance with some embodiments, a method includes displaying a first high contrast image on one or more display screens; and projecting the first high contrast image through a first Fresnel lens to provide a cue for adjusting a location of the first Fresnel lens.

In accordance with some embodiments, a device includes a frame; and a first set of one or more lenses, including a first Fresnel lens. The device also includes one or more display screens configured to project a first high contrast image through the first set of one or more lenses while the device is in a lens position adjustment mode. The projection of the first high contrast image provides a cue for adjusting a location of the first Fresnel lens.

Thus, the disclosed embodiments provide devices and methods that facilitate accurate determination and/or adjustment of interpupillary distances.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
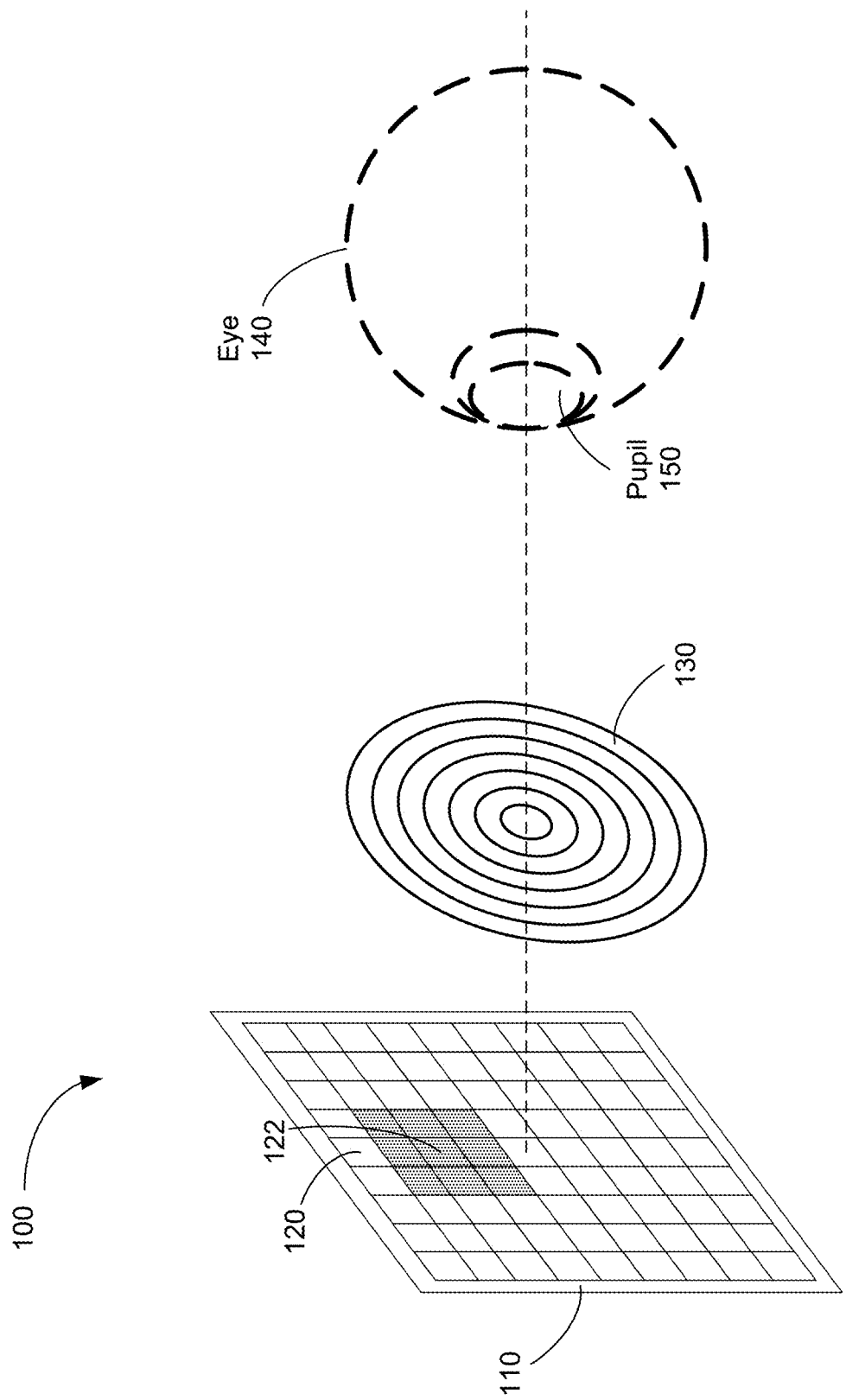
FIG. 1A is a schematic diagram of a device for determining and/or adjusting an offset of a lens in accordance with some embodiments.

These figures are not drawn to scale unless indicated otherwise.

DETAILED DESCRIPTION

Many viewing optics (e.g., eyeglasses, head-mounted display devices, etc.) require a correct positioning of the viewing optics relative to a position of an eye. Incorrect positioning of viewing optics can cause visual distortion. However, determining an accurate interpupillary distance has often required professional assistance (e.g., a measurement by an optician). In the absence of such professional assistance, users can set up viewing optics for incorrect interpupillary distances. For example, users may be asked to adjust lateral positions of lenses until a crosshair appears the sharpest. Certain users may not be able to accurately determine when the crosshair appears the sharpest.

The disclosed device, including a display device coupled with Fresnel lenses, allows accurate determination and/or adjustment of an interpupillary distance utilizing a diffraction pattern in a projection of a high contrast image.

Fresnel lenses have multiple concentric annular sections that are offset from one another (e.g., for a circular lens). Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses can suffer from artifacts associated with Fresnel structures, and thus, their use in imaging applications is limited. In the disclosed embodiments, the artifacts associated with Fresnel lenses are utilized as guides for adjusting the interpupillary distance.

In some embodiments, the display device and the Fresnel lenses are included in a head-mounted display device, which is, in turn, used for providing virtual reality and/or augmented reality content. In some embodiments, the display device and the Fresnel lenses are included in a stand-alone diagnostic device for determining an interpupillary distance.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A is an isometric view of display device 100 in accordance with some embodiments. In some other embodiments, display device 100 is part of some other electronic display (e.g., head-mounted displays, digital microscope, etc.). In some embodiments, display device 100 includes light emission device array 110 and one or more lenses (e.g., lens 130). Light emission device array 110 emits image light toward a viewing user.

In some embodiments, light emission device array 110 includes light emission devices 120 (e.g., pixels) that emit light in the visible light. For example, light emission device array 110 includes an array of light-emitting diodes (LEDs), an array of microLEDs, an array of OLEDs, or some combination thereof.

In some embodiments, light emission device array 110 includes one or more light sources (e.g., a fluorescent light source or a broadband light source, such as a white LED) and an emission intensity array. The emission intensity array is configured to selectively attenuate light emitted from the one or more light sources. In some embodiments, the emission intensity array is composed of a plurality of liquid crystal cells or pixels. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from the one or more light sources is passed to the one or more lenses (e.g., lens 130). In some embodiments, the one or more light sources include light emission devices 120, such as an array of LEDs, an array of microLEDs, an array of OLEDs, or a combination thereof.

One or more lenses (e.g., lens 130) receive light from emission device array 110, and direct the light to a location of pupil 150. In some embodiments, lens 130 includes one or more diffractive optics. In some embodiments, the one or more lenses include active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 (described with respect to FIG. 2) may dynamically adjust the curvature and/or refractive ability of active lenslets to direct light received from light emission device array 110 to pupil 150. In some embodiments, the one or more lenses include a Fresnel lens (e.g., lens 130 is a Fresnel lens).

FIG. 1A also illustrates that light emission device array 110 provides a pattern of light. In particular, area 122 of light emission device array 110 is activated and the rest of light emission device array 110 is deactivated. As a result, area 122 of light emission device array 110 generates and/or provides light (e.g., a white light), whereas the rest of light emission device array 110 does not provide light (e.g., the rest of light emission device array 110 remains dark and/or black). In FIG. 1A, area 122 of light emission array 110 is vertically offset from a center (e.g., an optical center) of lens 130. For example, area 122 of light emission array 110 is located above an optical axis of Fresnel lens 130. Alternatively, area 122 of light emission array 110 is, in some cases, located below an optical axis of lens 130.

In some embodiments, a center of area 122 is located at least 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm away from an optical axis of lens 130. In some embodiments, a center of area 122 is located at least 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm above or below an optical axis of lens 130. In some embodiments, a center of area 122 is located between 1 mm and 2 mm, 2 mm and 3 mm, 3 mm and 4 mm, 4 mm and 5 mm, 5 mm and 6 mm, 6 mm and 7 mm, 7 mm and 8 mm, 8 mm and 9 mm, 9 mm and 10 mm, 10 mm and 11 mm, 11 mm and 12 mm, 12 mm and 13 mm, 13 mm and 14 mm, or 14 mm and 15 mm from an optical axis of lens 130.

In some embodiments, a center of area 122 is located above an optical axis of lens 130. In some embodiments, a center of area 122 is located below an optical axis of lens 130. In some embodiments, a center of area 122 is located directly above an optical axis of lens 130. In some embodiments, a center of area 122 is located directly below an optical axis of lens 130. In some embodiments, a horizontal position of the center of area 122 is offset from a horizontal position of the optical axis of lens 130 by 0.5 mm or less, 1 mm or less, or 2 mm or less.

Figure 1B:
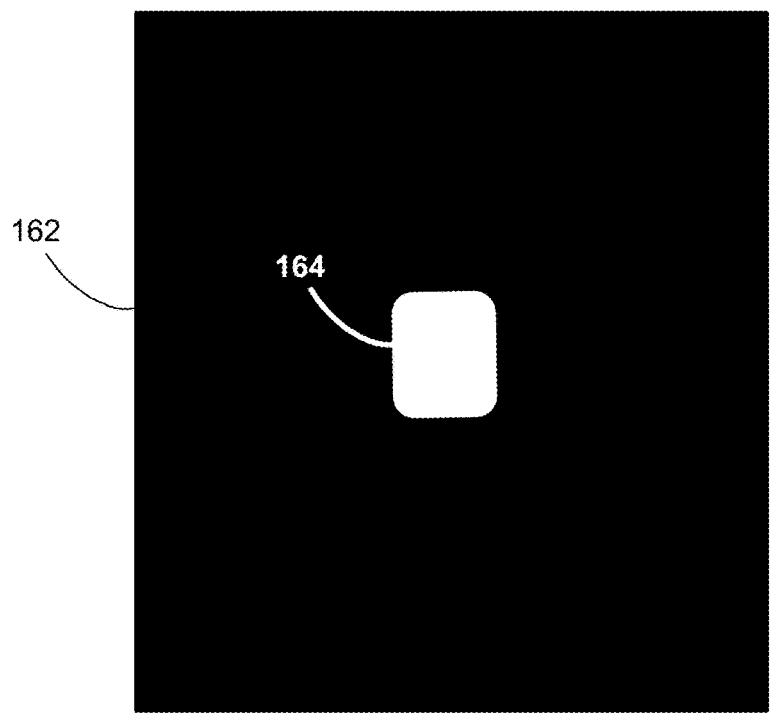
FIG. 1B is a prophetic example of a high contrast image in accordance with some embodiments.
Figure 1C:
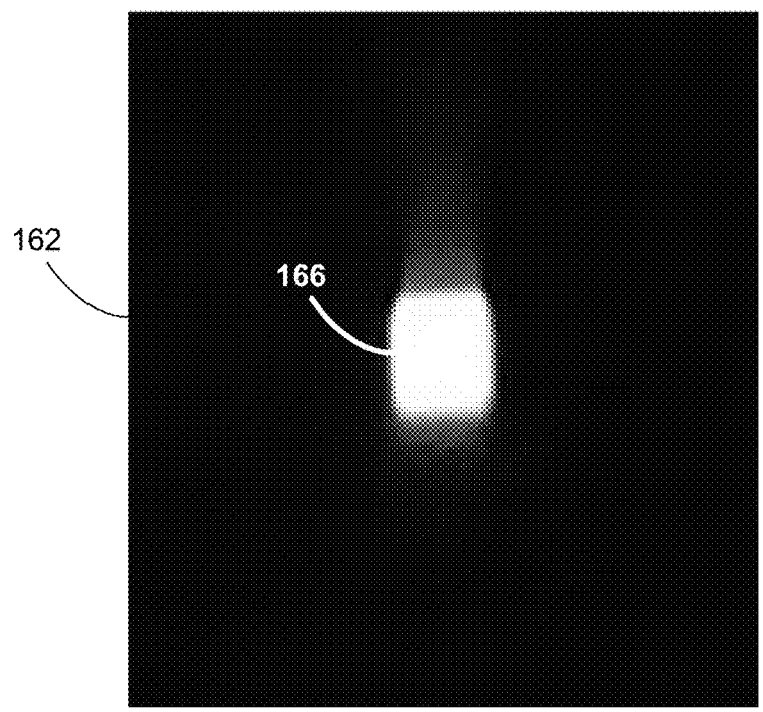
FIG. 1C is an example of a projection of the high contrast image in accordance with some embodiments.
Figure 1D:
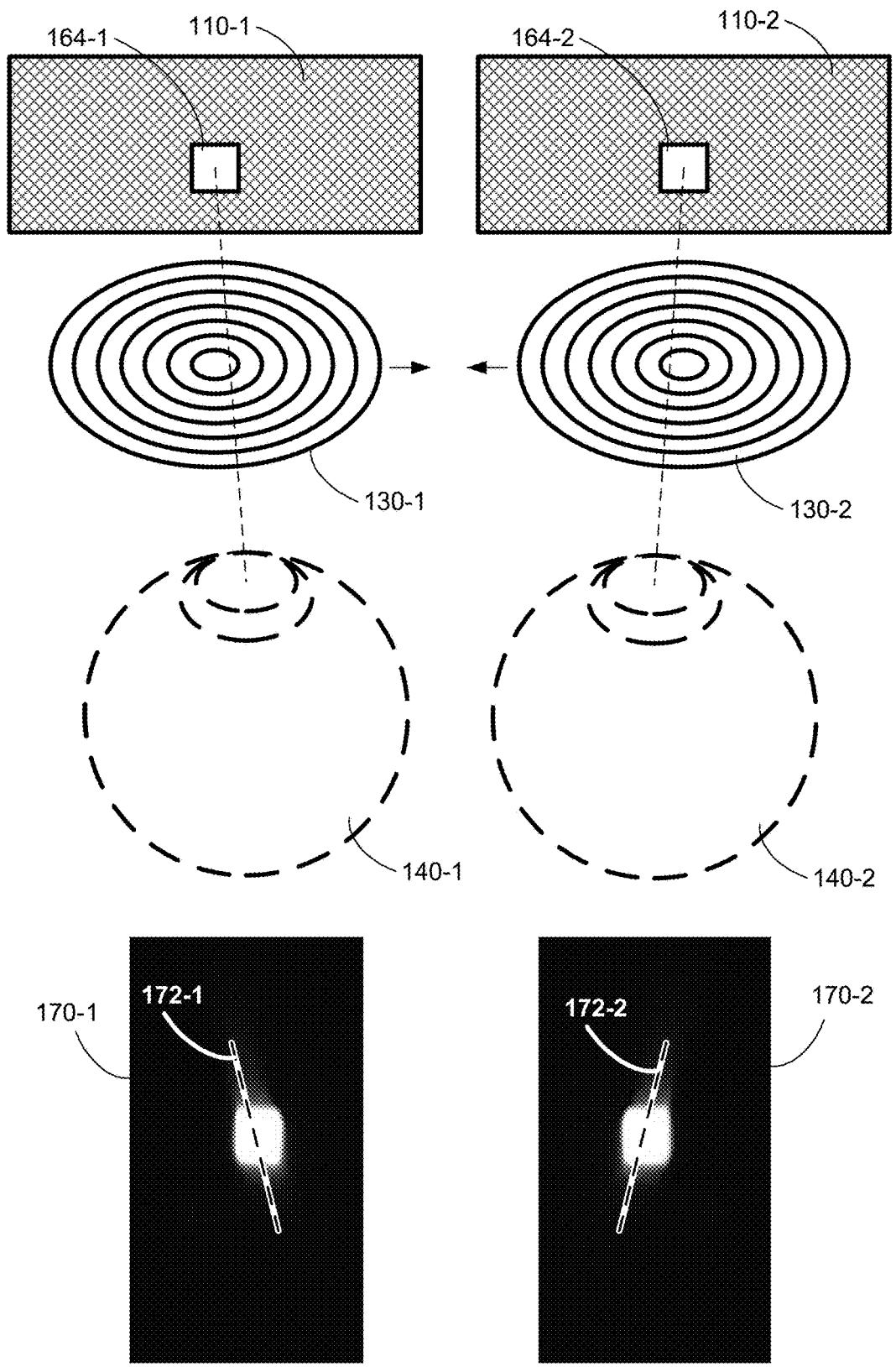
FIG. 1D is a schematic diagram of a device used with eyes having a short interpupillary distance.
Figure 1E:
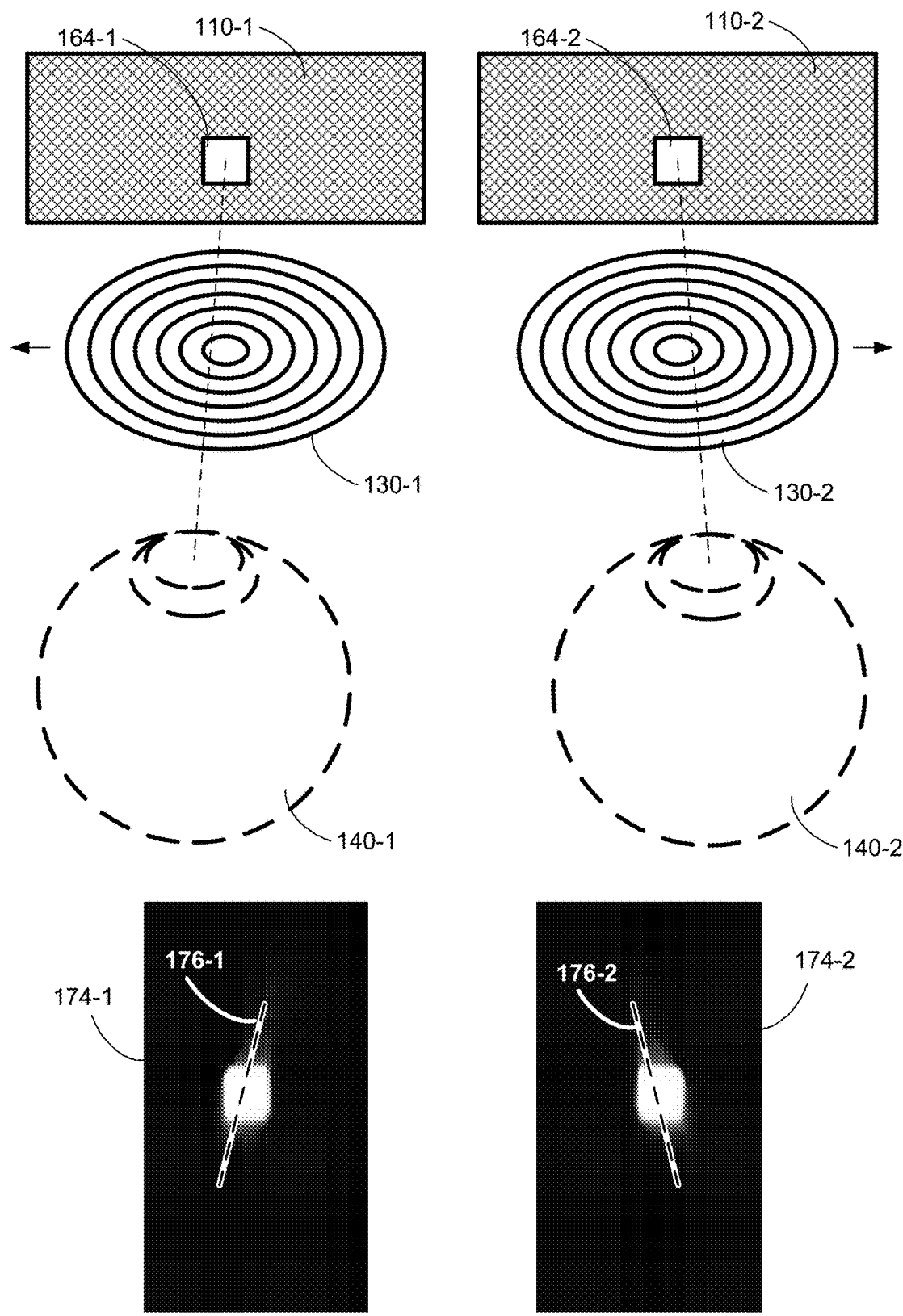
FIG. 1E is a schematic diagram of a device used with eyes having a long interpupillary distance.
Figure 1F:
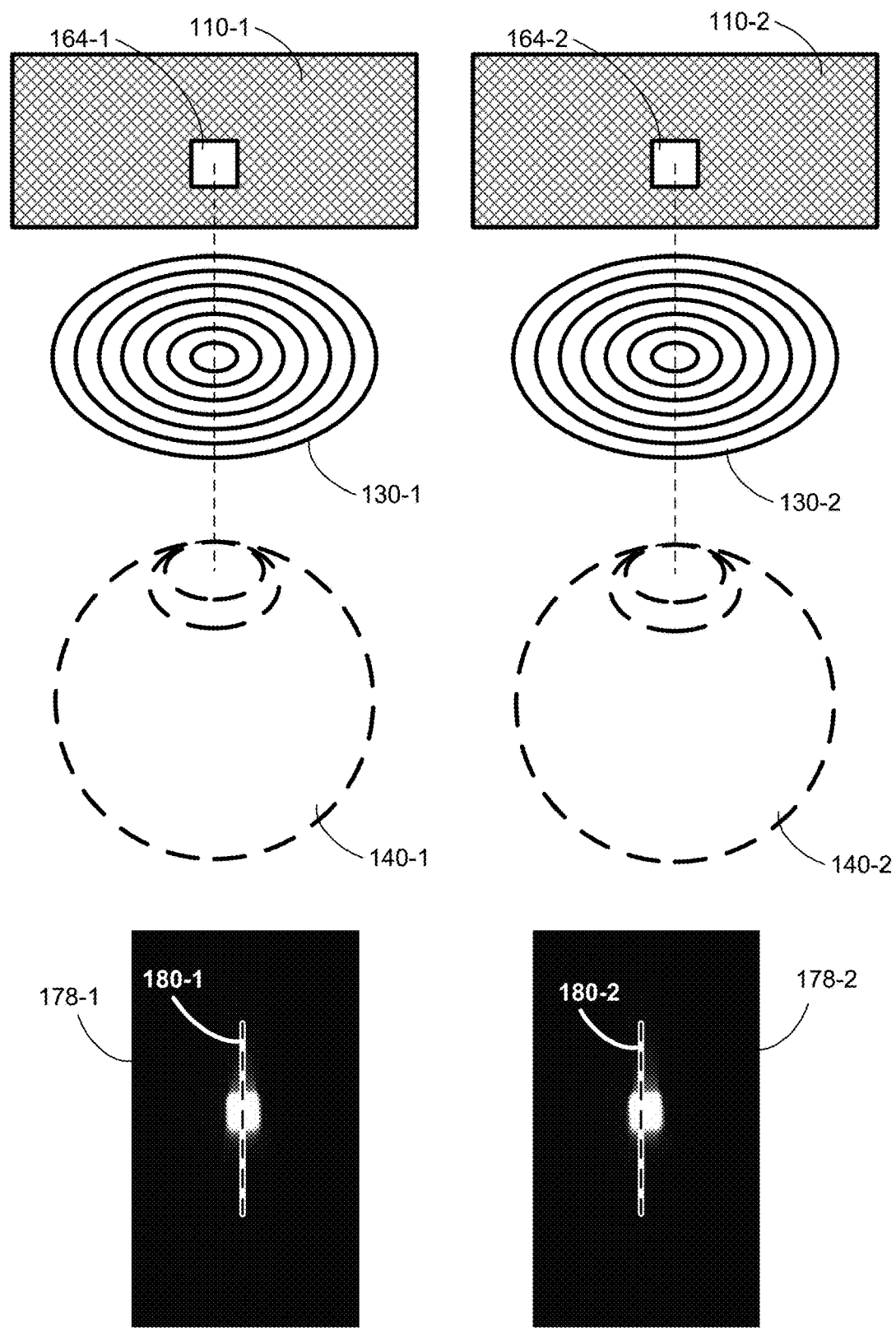
FIG. 1F is a schematic diagram of a device used with eyes having a matching interpupillary distance.
Figure 1G:
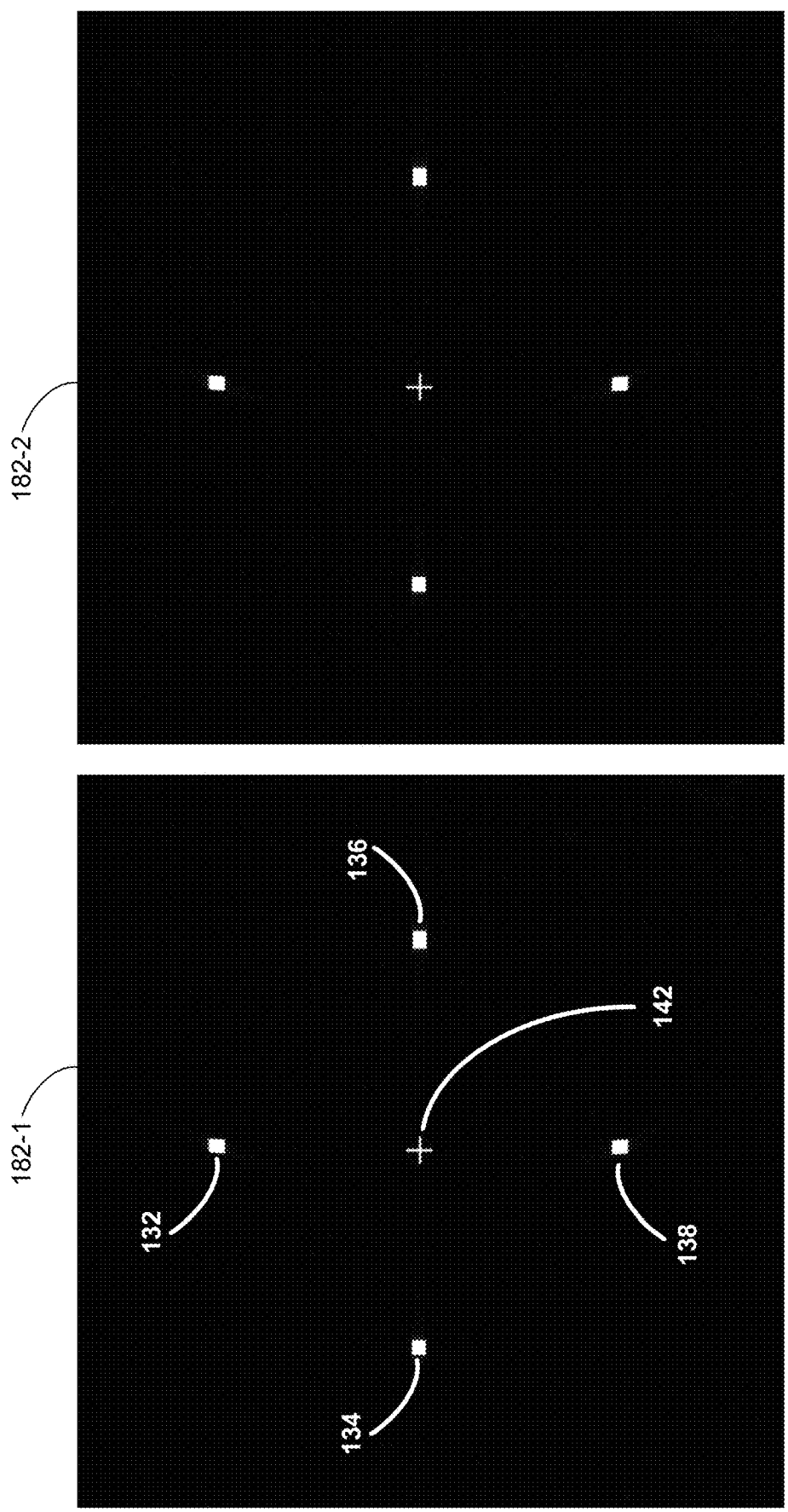
FIG. 1G is a prophetic example of high contrast images in accordance with some embodiments.

Additionally or alternatively, one or more areas that are offset horizontally and/or diagonally from the optical axis of lens 130 may be activated (e.g., FIG. 1G).

Offsetting area 122 of light emission array 110 (e.g., vertically, horizontally, or diagonally) from an optical axis of Fresnel lens 130 (e.g., providing light from an area that is located above or below an optical axis of Fresnel lens 130) increases and/or emphasizes optical artifacts (e.g., diffraction) caused by Fresnel lens 130.

FIG. 1B is a prophetic example of a high contrast image in accordance with some embodiments.

The high contrast image includes object 164 having a high brightness, surrounded by low brightness (e.g., dark and/or black) background 162. For example, one or more pixels of a display screen for object 164 are activated to provide light and the surrounding pixels are deactivated so that no light or reduced light is provided from the surrounding pixels, as shown in FIG. 1A. In some embodiments, a contrast ratio of the high brightness object and the surrounding background is at least 10:1, 20:1, 30:1, 40:1, 50:1, 60:1, 70:1, 80:1, 90:1, 100:1, 200:1, 300:1, 400:1, 500:1, 600:1, 700:1, 800:1, 900:1, 1000:1, 2000:1, 3000:1, 4000:1, 5000:1, 6000:1, 7000:1, 8000:1, 9000:1, or 10000:1.

In some embodiments, the one or more activated pixels are configured to provide a white light (e.g., when the pixel includes subpixels of different colors, such as one or more red subpixels, one or more green subpixels, and one or more blue pixels, subpixels of different colors are all activated). In some embodiments, the one or more activated pixels are configured to provide a colored light (e.g., red, green, or blue). In some embodiments, a subset, less than all, of the subpixels of the one or more pixels is activated. In some embodiments, all of the subpixels of the one or more pixels are activated. In some embodiments, object 164 has a shape of a rectangle (e.g., a square). In some embodiments, object 164 has a shape of a circle. In some embodiments, object 164 has any other shape (e.g., rhombus, oblong, cross, etc.). In some embodiments, the high contrast image includes a single object (e.g., object 164), as shown in FIG. 1B. In some embodiments, the high contrast image includes multiple objects (e.g., FIG. 1G). In some embodiments, the multiple objects are separated from one another.

FIG. 1C is an example of a projection of the high contrast image (shown in FIG. 1B) in accordance with some embodiments.

The projection of the high contrast image has optical artifacts (e.g., blurring) above and below projected object 166. In some embodiments, the optical artifacts are caused by diffraction of a Fresnel lens (e.g., lens 130 in FIG. 1A).

FIG. 1D is a schematic diagram of a device used with eyes having a short interpupillary distance.

In FIG. 1D, the device includes display screen 110-1 and display screen 110-2. Display screen 110-1 display a high contrast image (e.g., FIG. 1B) with object 164-1 for left eye 140-1 and display screen 110-2 displays a high contrast image with object 164-2 for right eye 140-2. Alternatively, a single display screen or more than two display screens (e.g., two or more consecutive display screens for each eye) can be used. For example, a single display screen displays two objects: first object 164-1 for left eye 140-1 and second object 164-2 for right eye 140-2. The two objects are typically verged at infinity.

The device also includes Fresnel lens 130-1 configured for projecting the high contrast image, including object 164-1, displayed on display screen 110-1 toward left eye 140-1. The device also includes Fresnel lens 130-1 configured for projecting the high contrast image, including object 164-2, displayed on display screen 110-2 toward right eye 140-2. Projected image 170-1 is viewed by left eye 140-1 and projected image 170-2 is viewed by right eye 140-2.

As shown in FIG. 1D, eyes 140-1 and 140-2 are located closer to each other than a distance between Fresnel lens 130-1 and Fresnel lens 130-2 (e.g., an interpupillary distance between eyes 140-1 and 140-2 is less than a center distance between Fresnel lens 130-1 and Fresnel lens 130-2).

FIG. 1D also illustrates that optical artifacts in projected images 170-1 and 170-2 are tilted. In FIG. 1D, projected images 170-1 and 170-2 are annotated with guidelines 172-1 and 172-2 to emphasize the orientation (e.g., tilting) of optical artifacts. The orientation (e.g., tilting) of optical artifacts serves as a visual cue indicating that the distance (e.g., a center distance) between lenses 130-1 and 130-2 does not match the interpupillary distance. In addition, the orientation of optical artifacts indicates that the distance between lenses 130-1 and 130-2 needs to be reduced to match the interpupillary distance.

FIG. 1E is a schematic diagram of a device used with eyes having a long interpupillary distance.

The device shown in FIG. 1E is similar to the device shown in FIG. 1D. However, in FIG. 1E, a distance between eyes 140-1 and 140-2 is greater than a distance between Fresnel lens 130-1 and Fresnel lens 130-2 (e.g., an interpupillary distance between eyes 140-1 and 140-2 is greater than a center distance between Fresnel lens 130-1 and Fresnel lens 130-2).

FIG. 1E also illustrates that optical artifacts in projected images 174-1 and 174-2 are tilted. In FIG. 1E, projected images 174-1 and 174-2 are annotated with guidelines 176-1 and 176-2 to emphasize the orientation (e.g., tilting) of optical artifacts. As explained above with respect to FIG. 1D, the orientation (e.g., tilting) of optical artifacts serves as a visual cue indicating that the distance (e.g., a center distance) between lenses 130-1 and 130-2 does not match the interpupillary distance. In addition, the orientation of optical artifacts indicates that the distance between lenses 130-1 and 130-2 needs to be increased to match the interpupillary distance.

FIG. 1F is a schematic diagram of a device used with eyes having a matching interpupillary distance.

The device shown in FIG. 1F is similar to the device shown in FIG. 1D. However, in FIG. 1F, a distance between eyes 140-1 and 140-2 matches a distance between Fresnel lens 130-1 and Fresnel lens 130-2 (e.g., an interpupillary distance between eyes 140-1 and 140-2 corresponds to a center distance between Fresnel lens 130-1 and Fresnel lens 130-2).

FIG. 1F also illustrates that optical artifacts in projected images 178-1 and 178-2 are aligned vertically (e.g., the optical artifacts extend vertically). In FIG. 1F, projected images 178-1 and 178-2 are annotated with guidelines 180-1 and 180-2 to emphasize the orientation of optical artifacts. In FIG. 1F, the vertical orientation (e.g., no tilting) of optical artifacts serves as a visual cue indicating that the distance (e.g., a center distance) between lenses 130-1 and 130-2 matches the interpupillary distance. Thus, from vertically aligned optical artifacts, it is determined that Fresnel lenses 130-1 and 130-2 are positioned to match the interpupillary distance.

As explained above, the device illustrated in FIGS. 1D-1F can be used to determine an interpupillary distance (e.g., the interpupillary distance can be determined from the positions of Fresnel lenses 130-1 and 130-2 when the optical artifacts are vertically aligned). Thus, in some embodiments, the device can be used as a device for measuring an interpupillary distance. In some embodiments, the device is included in, and/or coupled with, another optical device (e.g., a head-mounted display device as shown in FIG. 1N, an optical microscope, binoculars, etc.) to adjust the optical device to match the interpupillary distance.

In addition, although FIGS. 1D-1F illustrate adjusting positions of two lenses, it is possible to use an analogous method for adjusting a position of a single lens of a single lens system (e.g., a display system configured to operate with a single eye only), or separately adjusting a position of an individual lens of a multi-lens system.

FIG. 1G is a prophetic example of high contrast images 182-1 and 182-2 in accordance with some embodiments. In some cases, high contrast image 182-1 is projected toward a left eye and high contrast image 182-2 is projected toward a right eye. In some embodiments, high contrast image 182-1 is identical to high contrast image 182-2. In some embodiments, high contrast image 182-1 is distinct from high contrast image 182-2. In some embodiments, high contrast image 182-1 is a mirror image of high contrast image 182-2.

In some embodiments, a high contrast image includes multiple objects having a high brightness (e.g., high contrast image 182-1 shown in FIG. 1G includes four objects 132, 134, 136, and 138 having a high brightness). In some embodiments, objects 132 and 138 located above and below guide 142 provide a cue for adjusting a lateral location of a Fresnel lens (e.g., optical artifacts associated with objects 132 and 138 indicate an incorrect lateral positioning of the Fresnel lens). In some embodiments, objects 134 and 136 located left and right sides of guide 142 provide a cue for adjusting a vertical location of a Fresnel lens (e.g., optical artifacts associated with objects 134 and 136 indicate an incorrect vertical positioning of the Fresnel lens).

In some embodiments, the high contrast image includes additional features (e.g., crosshairs, grids, and/or alignment indicators) for assisting a user with determining the orientation of optical artifacts in the projection of the high contrast image. In some embodiments, the additional features also have a high brightness. In some embodiments, the additional features have a brightness less than the brightness of the one or more objects (e.g., objects 132, 134, 136, and 138). Displaying the additional features at a reduced brightness makes optical artifacts of the additional features less visible, thereby facilitating users to focus on optical artifacts of the high brightness objects. In FIG. 1G, the high contrast image includes guide 142 (e.g., a crosshair) that is located at a position that corresponds to an optical axis of Fresnel lens 130. Guide 142 serves as a reference for determining an orientation of optical artifacts, as explained below with respect to FIGS. 1H-1M. In some embodiments, the high contrast image optionally includes instructions for guiding users to adjust the positions of the first Fresnel lens and the second Fresnel lens.

FIGS. 1H-1M are examples of projections of the high contrast images (shown in FIG. 1G) in accordance with some embodiments.

Figure 1H:
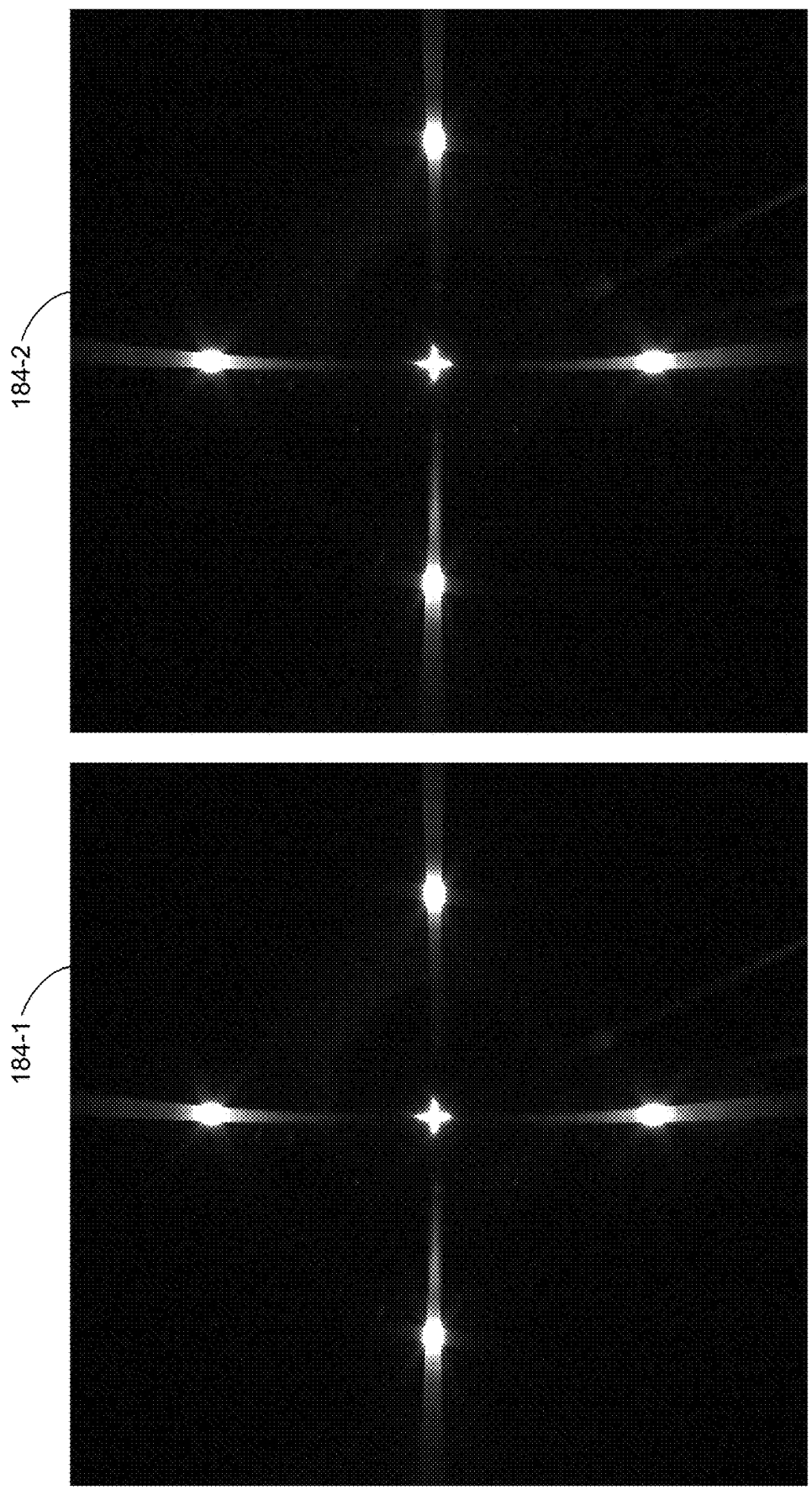
FIGS. 1H-1M are examples of projections of the high contrast images in accordance with some embodiments.

FIG. 1H shows projection 184-1 of high contrast image 182-1 (FIG. 1G) through a first Fresnel lens (e.g., for a left eye) and projection 184-2 of high contrast image 182-1 (FIG. 1G) through a second Fresnel lens (e.g., for a right eye) when the first Fresnel lens and the second Fresnel lens are positioned correctly (e.g., an optical center of the first Fresnel lens is located on an optical axis of the left eye and an optical center of the second Fresnel lens is located on an optical axis of the right eye).

In projection 184-1, optical artifacts of objects 132 and 138 located above and below guide 142 (FIG. 1G) extend vertically toward guide 142. This indicates that a lateral position of the first Fresnel lens matches a lateral position of the pupil of an eye (e.g., a left eye). In addition, optical artifacts of objects 134 and 136 located left and right sides of guide 142 (FIG. 1G) extend horizontally toward guide 142. This indicates that a vertical position of the first Fresnel lens matches a vertical position of the pupil of the eye (e.g., the left eye). Similarly, projection 184-2 also indicates that a lateral position of the second Fresnel lens matches a lateral position of the pupil of the other eye (e.g., a right eye) and a vertical position of the second Fresnel lens matches a vertical position of the pupil of the other eye (e.g., the right eye). Thus, no adjustment of the position of the first Fresnel lens or the position of the second Fresnel lens is necessary.

Figure 1I:
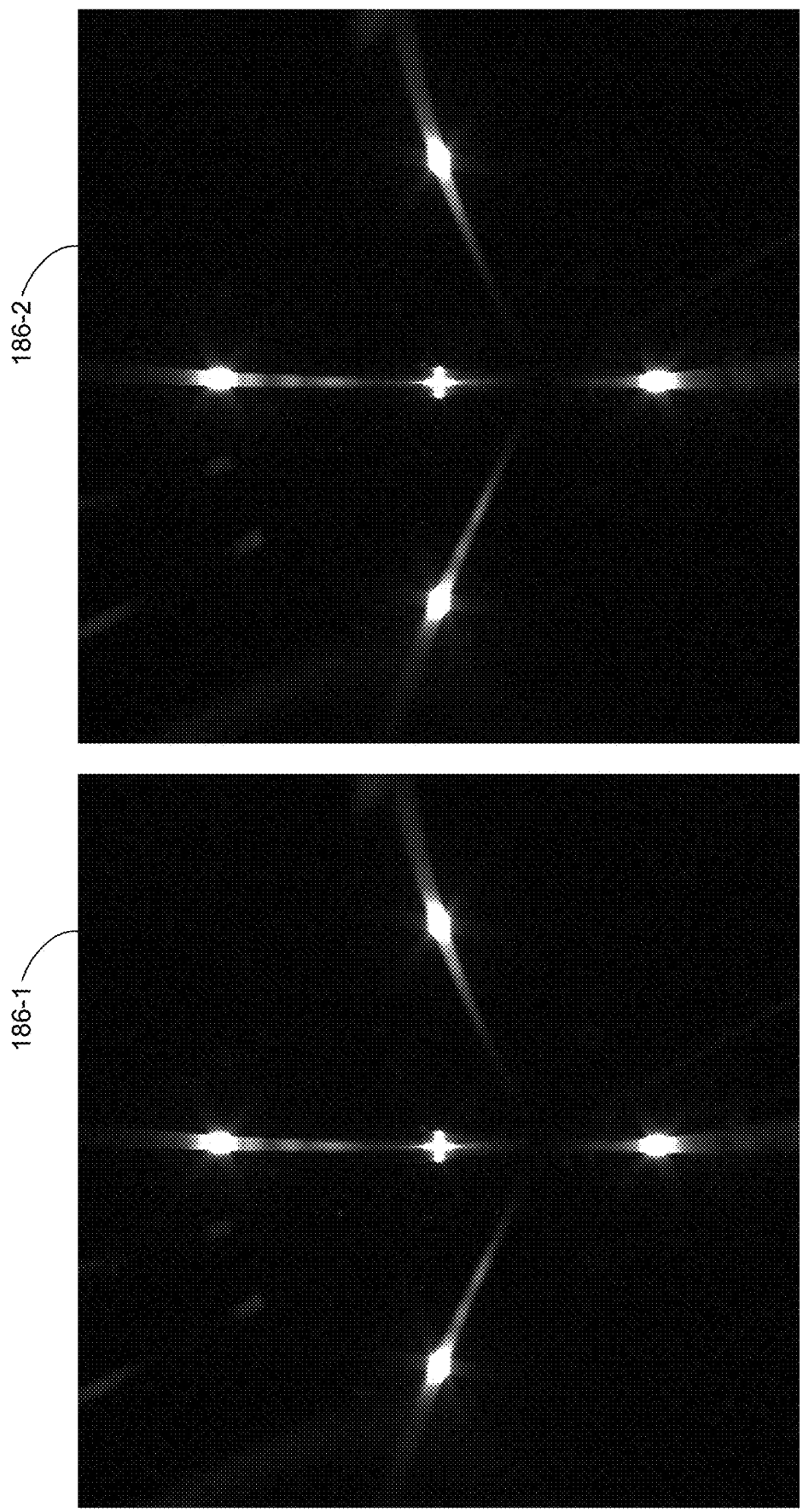

FIG. 1I shows projection 186-1 of high contrast image 182-1 (FIG. 1G) through the first Fresnel lens (e.g., for the left eye) and projection 186-2 of high contrast image 182-1 (FIG. 1G) through the second Fresnel lens (e.g., for the right eye) when the first Fresnel lens and the second Fresnel lens are positioned low (e.g., an optical center of the first Fresnel lens is located below an optical axis of the left eye and an optical center of the second Fresnel lens is located below an optical axis of the right eye).

In projection 186-1, optical artifacts of objects 132 and 138 located above and below guide 142 (FIG. 1G) extend vertically toward guide 142. This indicates that a lateral position of the first Fresnel lens matches a lateral position of the pupil of an eye (e.g., a left eye). Optical artifacts of objects 134 and 136 located left and right sides of guide 142 (FIG. 1G) extend diagonally toward a point below guide 142. This indicates that a vertical position of the first Fresnel lens is lower than a vertical position of the pupil of the eye (e.g., the left eye). Similarly, projection 186-2 also indicates that a lateral position of the second Fresnel lens matches a lateral position of the pupil of the other eye (e.g., a right eye) and a vertical position of the second Fresnel lens is lower than a vertical position of the pupil of the other eye (e.g., the right eye).

When the first Fresnel lens and the second Fresnel lens are included in a head-mounted display device, this indicates that the head-mounted display device is positioned too low on the user's head. Thus, the user can reposition the head-mounted display device up on the user's head (e.g., push up the head-mounted display device on the user's head) until the projection of high contrast image 182-1 changes to projection 184-1 and the projection of high contrast image 182-2 changes to projection 184-2 shown in FIG. 1H.

Figure 1J:
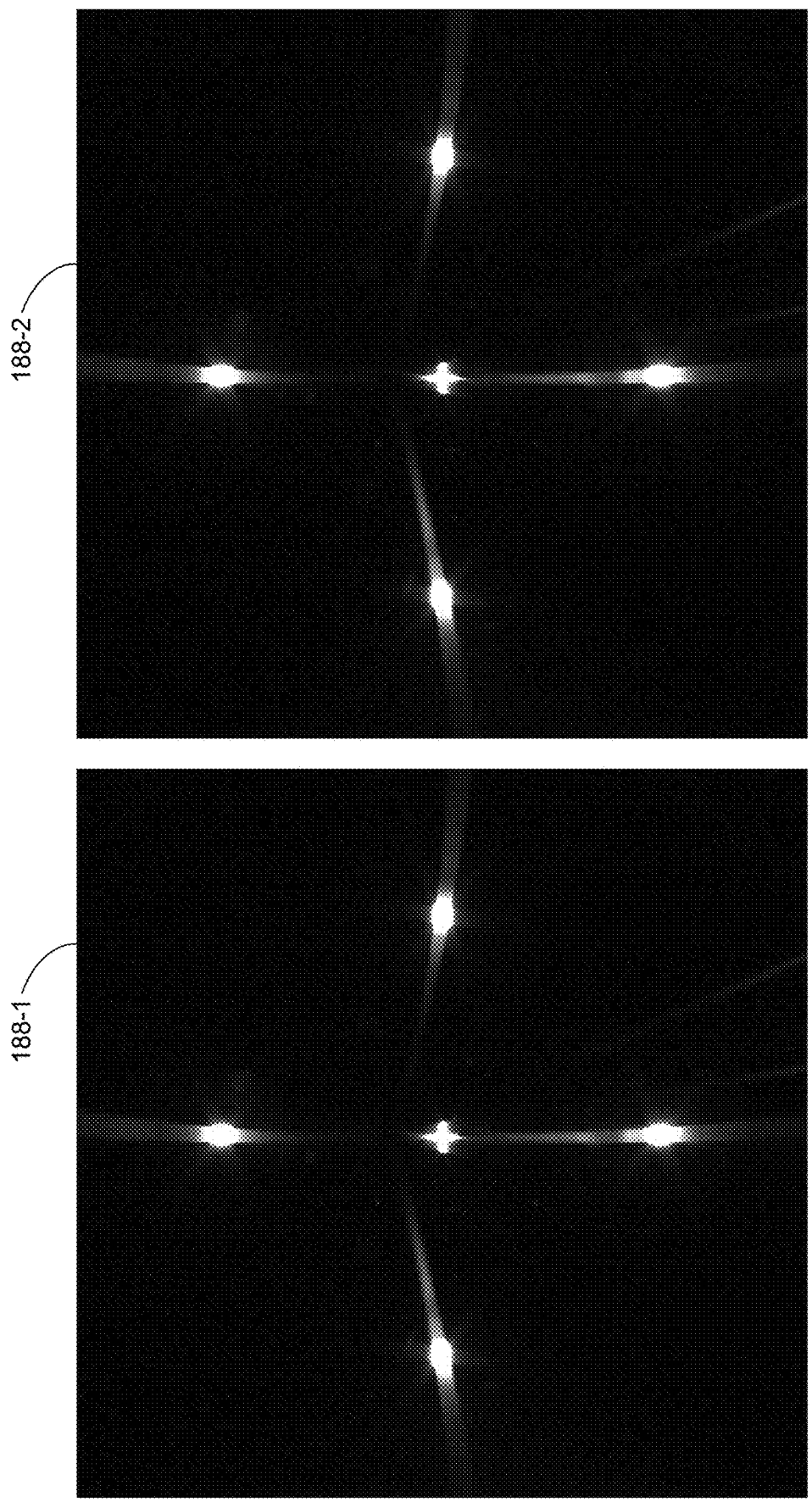

FIG. 1J shows projection 188-1 of high contrast image 182-1 (FIG. 1G) through the first Fresnel lens (e.g., for the left eye) and projection 188-2 of high contrast image 182-1 (FIG. 1G) through the second Fresnel lens (e.g., for the right eye) when the first Fresnel lens and the second Fresnel lens are positioned high (e.g., an optical center of the first Fresnel lens is located above an optical axis of the left eye and an optical center of the second Fresnel lens is located above an optical axis of the right eye).

In projection 188-1, optical artifacts of objects 132 and 138 located above and below guide 142 (FIG. 1G) extend vertically toward guide 142. This indicates that a lateral position of the first Fresnel lens matches a lateral position of the pupil of an eye (e.g., a left eye). Optical artifacts of objects 134 and 136 located left and right sides of guide 142 (FIG. 1G) extend diagonally toward a point above guide 142. This indicates that a vertical position of the first Fresnel lens is higher than a vertical position of the pupil of the eye (e.g., the left eye). Similarly, projection 188-2 also indicates that a lateral position of the second Fresnel lens matches a lateral position of the pupil of the other eye (e.g., a right eye) and a vertical position of the second Fresnel lens is higher than a vertical position of the pupil of the other eye (e.g., the right eye).

When the first Fresnel lens and the second Fresnel lens are included in a head-mounted display device, this indicates that the head-mounted display device is positioned too high on the user's head. Thus, the user can reposition the head-mounted display device down on the user's head (e.g., pull down the head-mounted display device on the user's head) until the projection of high contrast image 182-1 changes to projection 184-1 and the projection of high contrast image 182-2 changes to projection 184-2 shown in FIG. 1H.

Figure 1K:
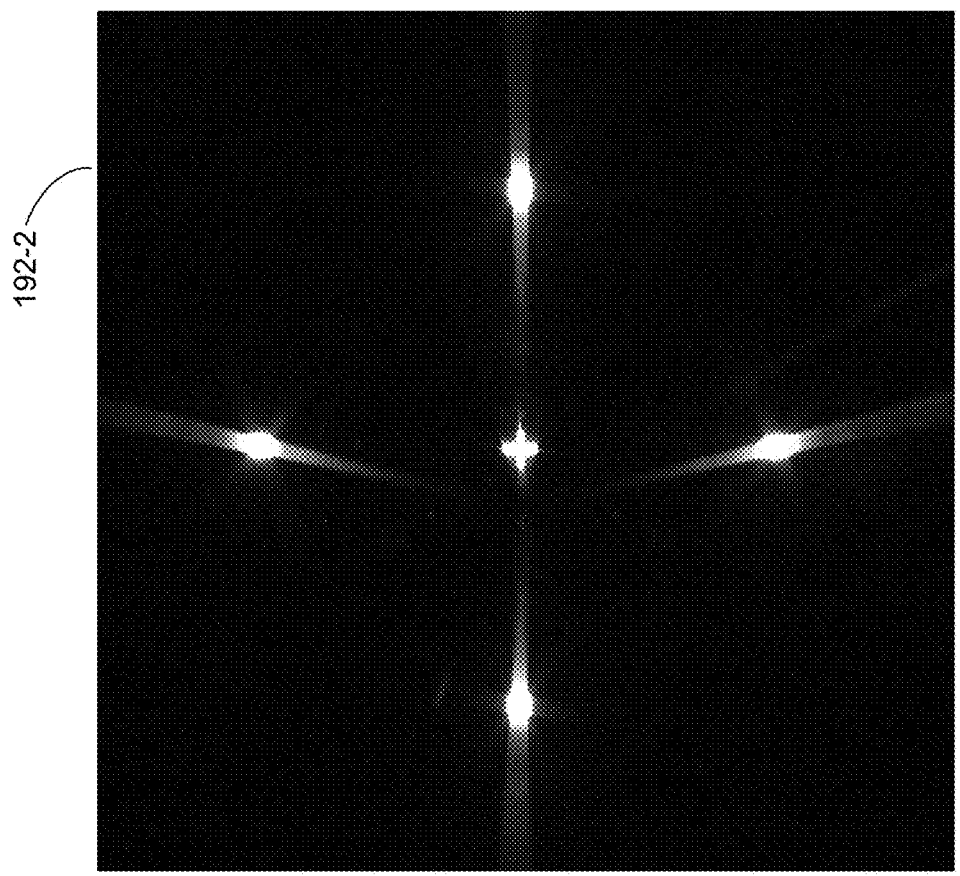
Figure 1K:
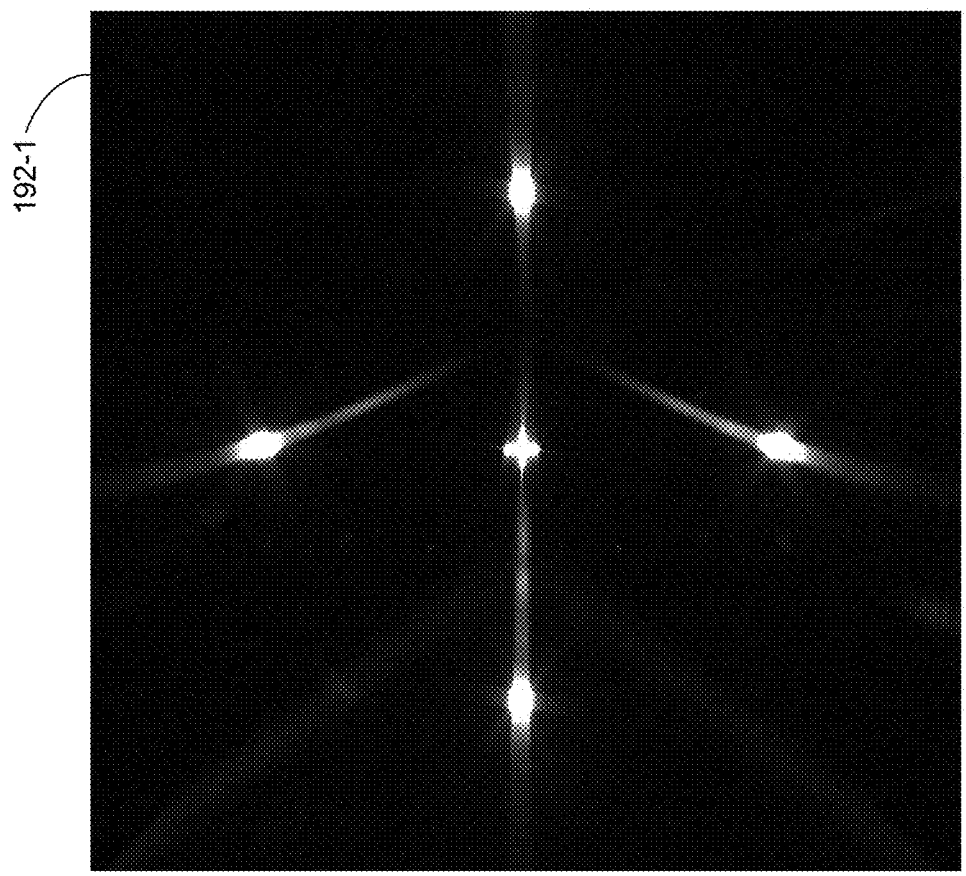

FIG. 1K shows projection 192-1 of high contrast image 182-1 (FIG. 1G) through the first Fresnel lens (e.g., for the left eye) and projection 192-2 of high contrast image 182-1 (FIG. 1G) through the second Fresnel lens (e.g., for the right eye) when the first Fresnel lens and the second Fresnel lens are positioned closer than the distance between the two eyes (e.g., a center distance between the first Fresnel lens and the second Fresnel lens is less than an interpupillary distance of the eyes).

In projection 192-1, optical artifacts of objects 132 and 138 located above and below guide 142 (FIG. 1G) extend diagonally toward a point located on a right side of guide 142. This indicates that a lateral position of the first Fresnel lens is located on the right side of a lateral position of the pupil of an eye (e.g., a left eye). Optical artifacts of objects 134 and 136 located left and right sides of guide 142 (FIG. 1G) extend horizontally toward guide 142. This indicates that a vertical position of the first Fresnel lens matches a vertical position of the pupil of the eye (e.g., the left eye). Projection 192-2 indicates that a lateral position of the second Fresnel lens is located on the left side of a lateral position of the pupil of the other eye (e.g., a right eye) and a vertical position of the second Fresnel lens matches a vertical position of the pupil of the other eye (e.g., the right eye).

When the first Fresnel lens and the second Fresnel lens are included in a head-mounted display device, this indicates that the head-mounted display device is configured for an interpupillary distance shorter than the interpupillary distance of the user. Thus, the user can adjust the distance between the first Fresnel lens and the second Fresnel lens (e.g., increasing an interpupillary distance setting for the head-mounted display device) until the projection of high contrast image 182-1 changes to projection 184-1 and the projection of high contrast image 182-2 changes to projection 184-2 shown in FIG. 1H.

Figure 1L:
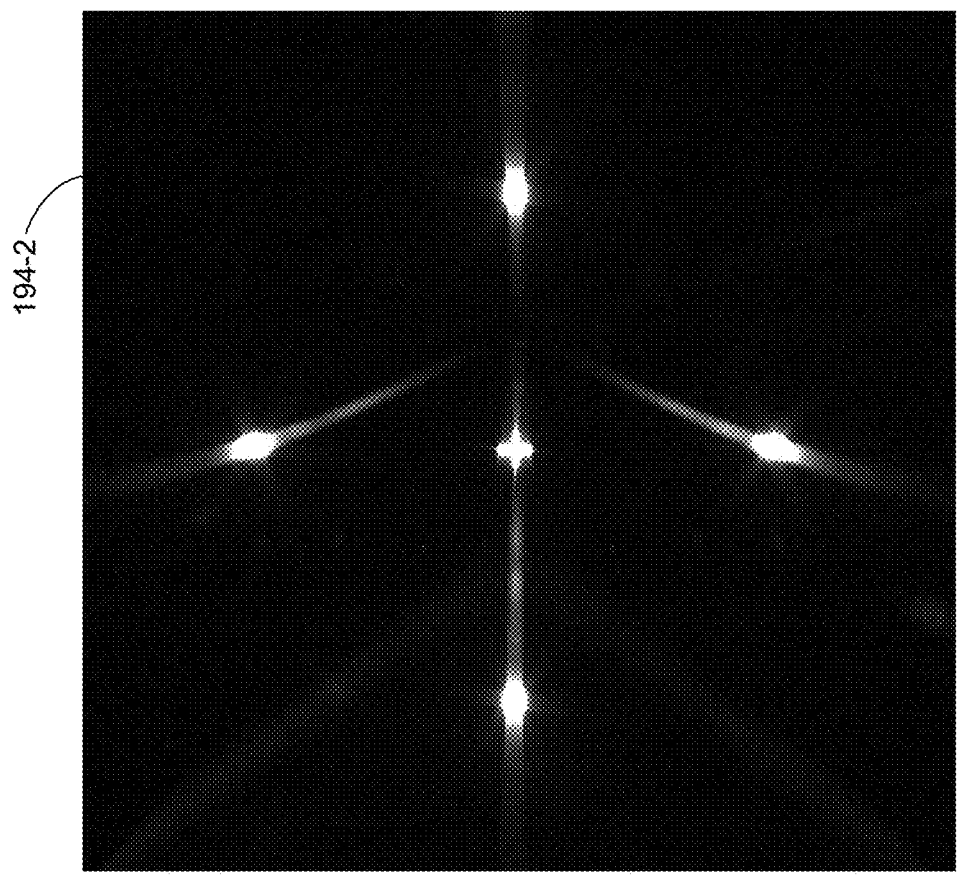
Figure 1L:
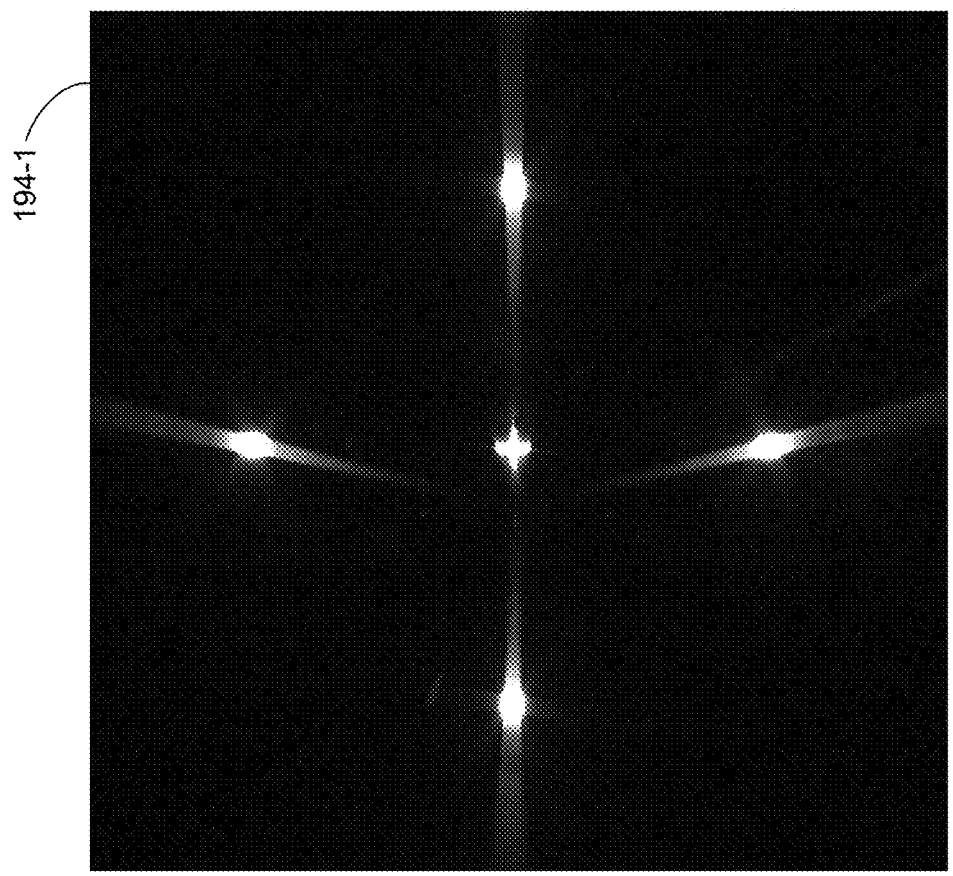

FIG. 1L shows projection 194-1 of high contrast image 182-1 (FIG. 1G) through the first Fresnel lens (e.g., for the left eye) and projection 194-2 of high contrast image 182-1 (FIG. 1G) through the second Fresnel lens (e.g., for the right eye) when the first Fresnel lens and the second Fresnel lens are positioned further apart than the distance between the two eyes (e.g., a center distance between the first Fresnel lens and the second Fresnel lens is greater than an interpupillary distance of the eyes).

In projection 194-1, optical artifacts of objects 132 and 138 located above and below guide 142 (FIG. 1G) extend diagonally toward a point located on a left side of guide 142. This indicates that a lateral position of the first Fresnel lens is located on the left side of a lateral position of the pupil of an eye (e.g., a left eye). Optical artifacts of objects 134 and 136 located left and right sides of guide 142 (FIG. 1G) extend horizontally toward guide 142. This indicates that a vertical position of the first Fresnel lens matches a vertical position of the pupil of the eye (e.g., the left eye). Projection 194-2 indicates that a lateral position of the second Fresnel lens is located on the right side of a lateral position of the pupil of the other eye (e.g., a right eye) and a vertical position of the second Fresnel lens matches a vertical position of the pupil of the other eye (e.g., the right eye).

When the first Fresnel lens and the second Fresnel lens are included in a head-mounted display device, this indicates that the head-mounted display device is configured for an interpupillary distance longer than the interpupillary distance of the user. Thus, the user can adjust the distance between the first Fresnel lens and the second Fresnel lens (e.g., decreasing an interpupillary distance setting for the head-mounted display device) until the projection of high contrast image 182-1 changes to projection 184-1 and the projection of high contrast image 182-2 changes to projection 184-2 shown in FIG. 1H.

Figure 1M:
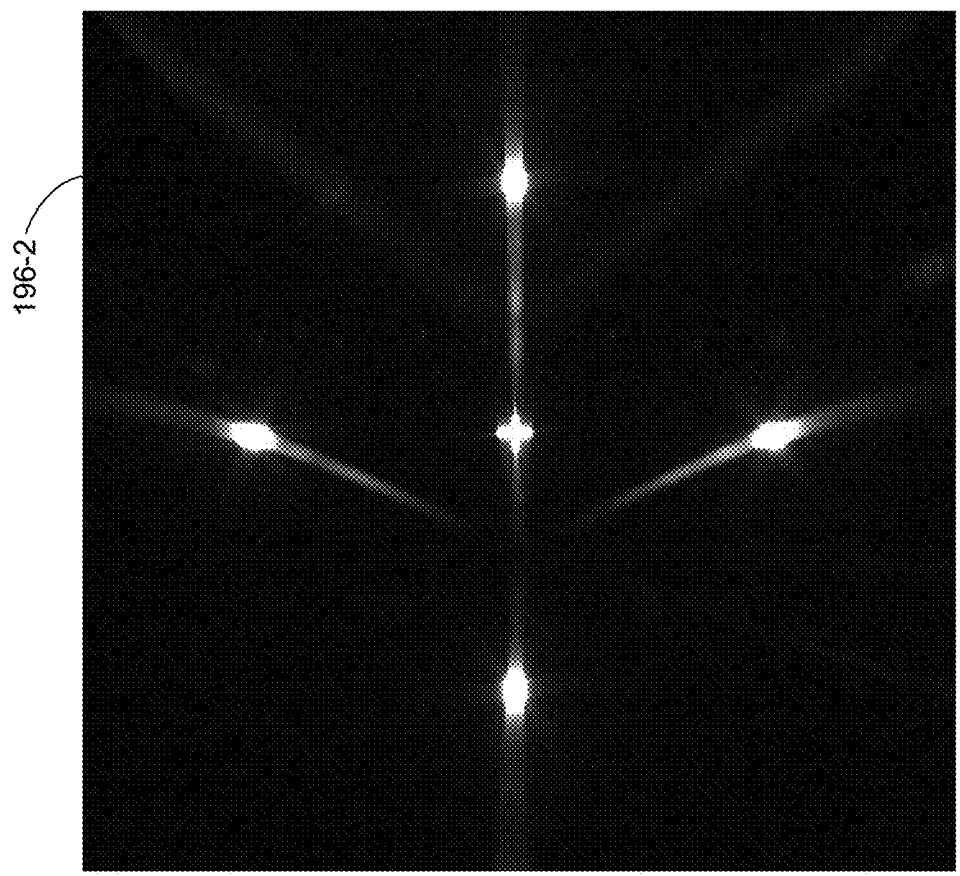
Figure 1M:
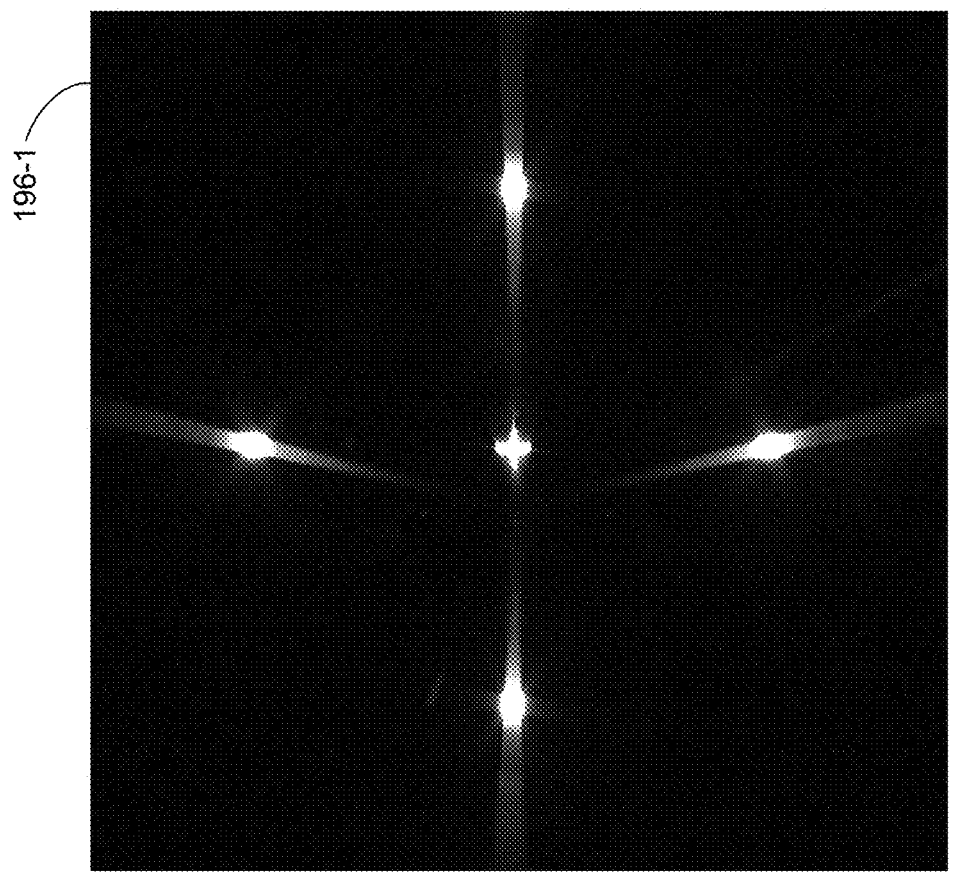
Figure 1N:
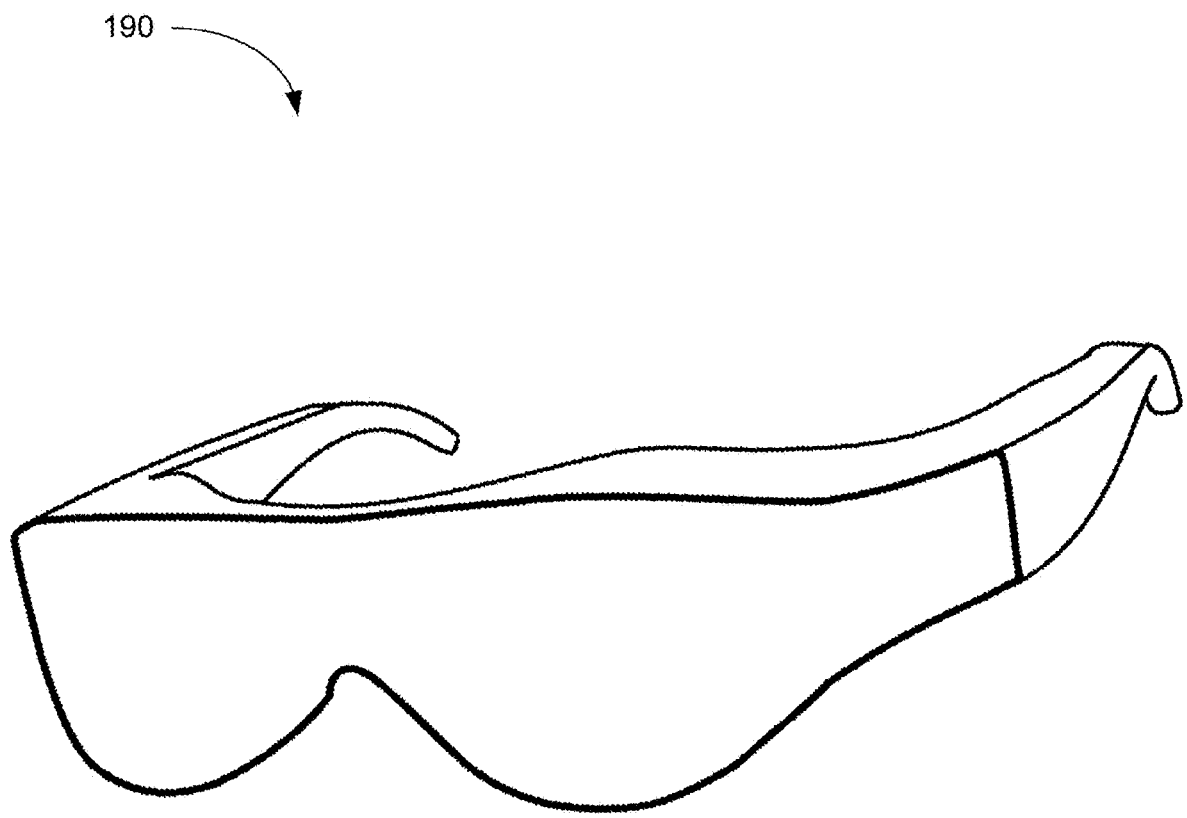
FIG. 1N is a perspective view of a device in accordance with some embodiments.

FIG. 1M shows projection 196-1 of high contrast image 182-1 (FIG. 1G) through the first Fresnel lens (e.g., for the left eye) and projection 196-2 of high contrast image 182-1 (FIG. 1G) through the second Fresnel lens (e.g., for the right eye) when the first Fresnel lens and the second Fresnel lens are both positioned left (e.g., an optical center of the first Fresnel lens is located on a left side of an optical axis of the left eye and an optical center of the second Fresnel lens is located on a left side of an optical axis of the right eye).

In projection 196-1, optical artifacts of objects 132 and 138 located above and below guide 142 (FIG. 1G) extend diagonally toward a point located on a left side of guide 142. This indicates that a lateral position of the first Fresnel lens is located on the left side of a lateral position of the pupil of an eye (e.g., a left eye). Optical artifacts of objects 134 and 136 located left and right sides of guide 142 (FIG. 1G) extend horizontally toward guide 142. This indicates that a vertical position of the first Fresnel lens matches a vertical position of the pupil of the eye (e.g., the left eye). Similarly, projection 196-2 also indicates that a lateral position of the second Fresnel lens is located on the left side of a lateral position of the pupil of the other eye (e.g., a right eye) and a vertical position of the second Fresnel lens matches a vertical position of the pupil of the other eye (e.g., the right eye).

When the first Fresnel lens and the second Fresnel lens are included in a head-mounted display device, this indicates that the head-mounted display device is positioned off toward a left side of the user. Thus, the user can reposition the head-mounted display device on the user's head (e.g., push the head-mounted display device toward a right side of the user's head) until the projection of high contrast image 182-1 changes to projection 184-1 and the projection of high contrast image 182-2 changes to projection 184-2 shown in FIG. 1H.

In some cases, either one or both of the Fresnel lenses can be positioned diagonally (e.g., an optical center of the first Fresnel lens is located diagonally from an optical axis of the left eye and/or an optical center of the second Fresnel lens is located diagonally from an optical axis of the right eye). The user can adjust the position (e.g., a lateral position and a vertical position) of the first Fresnel lens and/or the position (e.g., a lateral position and a vertical position) of the second Fresnel lens until the projection of high contrast image 182-1 changes to projection 184-1 and the projection of high contrast image 182-2 changes to projection 184-2 shown in FIG. 1H.

Although FIGS. 1G-1M illustrate a high contrast image including four objects having a high brightness, fewer or more objects having a high brightness can be used. For example, a high contrast image may include a first object having a high brightness for providing a cue for adjusting a lateral position of a Fresnel lens and a single object having a second object having a high brightness for providing a cue for adjusting a vertical position of the Fresnel lens.

FIG. 1N illustrates display device 190 in accordance with some embodiments. In some embodiments, display device 190 is configured to be worn on a head of a user (e.g., by having the form of spectacles or eyeglasses, as shown in FIG. 1N) or to be included as part of a helmet that is to be worn by the user. When display device 190 is configured to be worn on a head of a user or to be included as part of a helmet, display device 190 is called a head-mounted display. Alternatively, display device 190 is configured for placement in proximity of an eye or eyes of the user at a fixed location, without being head-mounted (e.g., display device 190 is mounted in a vehicle, such as a car or an airplane, for placement in front of an eye or eyes of the user).

In some embodiments, display device 190 includes one or more components described below with respect to FIG. 2. In some embodiments, display device 190 includes additional components not shown in FIG. 2.

Figure 2:
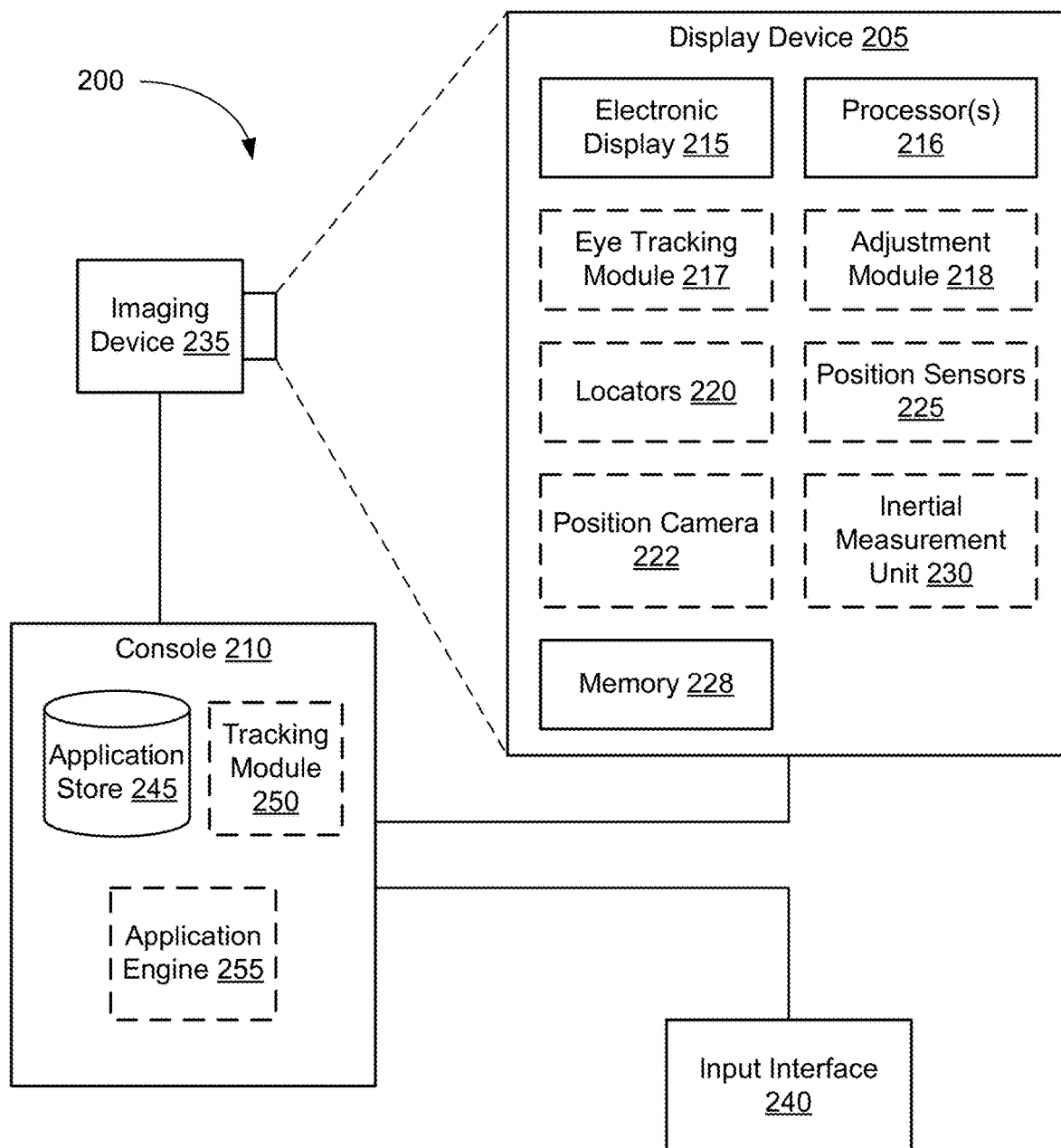
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 190 shown in FIG. 1N), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1N, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

In light of these principles, we now turn to certain embodiments.

In accordance with some embodiments, a method includes displaying a first high contrast image on one or more display screens (e.g., display of a first high contrast image including object 164-1 on display screen 110-1 as shown in FIG. 1D). The method also includes projecting the first high contrast image through a first Fresnel lens (e.g., lens 130-1 in FIG. 1D). In some embodiments, the projected image provides a cue for adjusting a location (e.g., a lateral position and/or a vertical position) of the first Fresnel lens. For example, as shown in FIGS. 1D and 1E, an orientation of optical artifacts in the projected image indicates that a lateral position (e.g., a horizontal position) of lens 130-1 does not match a horizontal position of eye 140-1.

In some embodiments, projecting the first high contrast image through the first Fresnel lens includes projecting optical artifacts associated with the first high contrast image displayed on the one or more display screens (e.g., projected image 170-1 in FIG. 1D includes a blurred image of object 164-1).

In some embodiments, the first high contrast image on the one or more display screens is positioned away from a center of the first Fresnel lens. For example, as shown in FIG. 1A, high brightness region 122 of the high contrast image is positioned above a center (e.g., an optical axis) of Fresnel lens 130. Alternatively, high brightness region 122 of the high contrast image can be positioned below the center (e.g., an optical axis) of Fresnel lens 130. In some cases, high brightness region 122 of the high contrast image is positioned on a left side or a right side of the center (e.g., an optical axis) of Fresnel lens 130.

In some embodiments, the first high contrast image on the one or more display screens is positioned above or below the center of the first Fresnel lens. In some embodiments, the first high contrast image on the one or more display screens is positioned directly above or directly below the center of the first Fresnel lens.

In some embodiments, the method also includes receiving a user input that corresponds to a request to move the first Fresnel lens laterally; and, in conjunction with receiving the user input, moving the first Fresnel lens laterally. For example, the user input is a press on a button on input interface 240, which initiates a lateral movement of the first Fresnel lens (e.g., moving the first Fresnel lens toward left or toward right), and the device moves the first Fresnel lens laterally with an actuator (e.g., a linear motor, a combination of a motor and gears, such as rack-and-pinion gears, etc.). In another example, the user input is sliding of a positioning knob, which is mechanically coupled with the first Fresnel lens. The sliding of the positioning knob causes a lateral movement of the first Fresnel lens through one or more mechanical connectors (e.g., a lateral slider). In yet another example, the user input is a rotation of a positioning knob, which is mechanically coupled with the first Fresnel lens through one or more gears (e.g., rack-and-pinion gears). The rotation of the positioning knob causes a lateral movement of the first Fresnel lens. In some embodiments, the method includes receiving a user input that corresponds to a request to move the first Fresnel lens laterally; and, in conjunction with receiving the user input, moving the first Fresnel lens vertically. In some embodiments, the method includes receiving a user input that corresponds to a request to move the first Fresnel lens laterally; and, in conjunction with receiving the user input, moving the first Fresnel lens diagonally (e.g., both horizontally and vertically).

In some embodiments, the method also includes displaying a second high contrast image that is distinct from the first high contrast image on the one or more display screens (e.g., display of a second high contrast image including object 164-2 on display screen 110-2 as shown in FIG. 1D); and projecting the second high contrast image through a second Fresnel lens (e.g., lens 130-2 in FIG. 1D).

In some embodiments, the second high contrast image on the one or more display screens is positioned away from a center of the second Fresnel lens. For example, in FIG. 1D, a high brightness region (e.g., object 164-2) of the high contrast image is positioned below a center (e.g., an optical axis) of Fresnel lens 130-2. Alternatively, a high brightness region (e.g., object 164-2) of the high contrast image can be positioned below the center (e.g., an optical axis) of Fresnel lens 130-2. In some cases, a high brightness region (e.g., object 164-2) of the high contrast image is positioned on a left side or a right side of the center (e.g., an optical axis) of Fresnel lens 130-2.

In some embodiments, the second high contrast image on the one or more display screens is positioned above or below the center of the second Fresnel lens. In some embodiments, the second high contrast image on the one or more display screens is positioned directly above or directly below the center of the second Fresnel lens.

In some embodiments, the method also includes receiving a user input that corresponds to a request to change an interpupillary distance of the first Fresnel lens and the second Fresnel lens; and, in conjunction with receiving the user input, moving the first Fresnel lens and the second Fresnel lens laterally to change the interpupillary distance of the first Fresnel lens and the second Fresnel lens. For example, in response to the user input, both the first Fresnel lens and the second Fresnel lens are moved closer to each other or away from each other. In some embodiments, the method includes receiving a user input that corresponds to a request to change an interpupillary distance of the first Fresnel lens and the second Fresnel lens; and, in conjunction with receiving the user input, moving the first Fresnel lens and/or the second Fresnel lens.

In some embodiments, the first high contrast image is projected toward one of a left eye and a right eye; and the second high contrast image is projected toward the other of the left eye and the right eye (e.g., in FIG. 1D, the first high contrast image, including object 164-1, is projected toward left eye 140-1 and the second high contrast image, including object 164-2, is projected toward right eye 140-2).

In accordance with some embodiments, a device includes a frame (e.g., a frame of a head-mounted display device shown in FIG. 1N). The device also includes a first set of one or more lenses, including a first Fresnel lens (e.g., lens 130-1 in FIG. 1D). In some embodiments, the first set of one or more lenses is configured to move laterally with respect to the frame (e.g., toward a left side of the frame or toward a right side of the frame). In some embodiments, the first set of one or more lenses is configured to move vertically or diagonally with respect to the frame. In some embodiments, the first set of one or more lenses is mechanically coupled with a slider (e.g., the first Fresnel lens is mechanically coupled with a slider). In some embodiments, the first set of one or more lenses is mechanically coupled with one or more actuators (e.g., the first Fresnel lens is mechanically coupled with an actuator, such as a rotary motor, a linear motor, rack-and-pinion gears, etc.).

The device further includes one or more display screens (e.g., display screen 110-1 in FIG. 1D) configured to project a first high contrast image (e.g., an image including object 164-1) through the first set of one or more lenses (e.g., Fresnel lens 130-1) while the device is in a lens position adjustment mode. For example, the device is configured to project the first high contrast image in accordance with a determination that the device has entered, or is entering, the lens position adjustment mode (e.g., an interpupillary distance adjustment mode). In some embodiments, the device foregoes displaying the first high contrast image while the device is not in the lens position adjustment mode (e.g., the device either remains turned off or displays media for virtual reality and/or augmented reality instead of the first high contrast image). The projection of the first high contrast image provides a cue for adjusting a location (e.g., a lateral position and/or a vertical position) of the first Fresnel lens.

In some embodiments, the first high contrast image includes an object having a high brightness surrounded by a low brightness background (e.g., FIG. 1B).

In some embodiments, the first high contrast image on the one or more display screens is positioned away from a center of the first Fresnel lens (e.g., when projected onto the first Fresnel lens). For example, as shown in FIG. 1A, the high brightness object corresponding to region 122 is located away from an optical axis of the first Fresnel lens. This induces and/or increases optical artifacts, which are used for adjusting a position of the first Fresnel lens.

In some embodiments, the first high contrast image on the one or more display screens is positioned above or below the center of the first Fresnel lens. Because adjusting the interpupillary distance changes horizontal positions of the lenses, placing the first high contrast image above or below the center of the first Fresnel lens simplifies the adjustment operation (e.g., a vertical alignment of optical artifacts indicates that the first Fresnel lens is correctly positioned). Alternatively, when the first high contrast image is placed diagonally from the center (or the optical axis) of the first Fresnel lens, a particular orientation (e.g., a non-vertical orientation) of the optical artifacts indicates that the first Fresnel lens is correctly positioned. In some embodiments, the first high contrast image on the one or more display screens is positioned on a left side or a right side of the center of the first Fresnel lens.

In some embodiments, the device also includes a second set of one or more lenses, including a second Fresnel lens that is distinct from the first Fresnel lens (e.g., lens 130-2 in FIG. 1D). In some embodiments, the second set of one or more lenses is configured to move laterally with respect to the frame. In some embodiments, the second set of one or more lenses is configured to move vertically and/or diagonally with respect to the frame. The one or more display screens are configured to project a second high contrast image (e.g., an image including object 164-2) that is distinct from the first high contrast image through the second set of one or more lenses while the device in the lens position adjustment mode.

In some embodiments, the first set of one or more lenses and the second set of one or more lenses are configured to move concurrently. For example, the first set of one or more lenses and the second set of one or more lenses concurrently move toward each other for a user having a short interpupillary distance. Alternatively, the first set of one or more lenses and the second set of one or more lenses concurrently move away from each other for a user having a long interpupillary distance. In some cases, the first set of one or more lenses and the second set of one or more lenses concurrently move up or down.

In accordance with some embodiments, a method includes receiving a projection of a first high contrast image transmitted through a first Fresnel lens (e.g., projected image 170-1 in FIG. 1D); and, in conjunction with receiving the projection of the first high contrast image, adjusting a position (e.g., a lateral position and/or a vertical position) of the first Fresnel lens based on the projection of the first high contrast image (e.g., moving the first Fresnel lens toward a right side).

In some embodiments, the method also includes receiving a projection of a second high contrast image transmitted through a second Fresnel lens that is distinct from the first Fresnel lens (e.g., projected image 170-2 in FIG. 1D); and, in conjunction with receiving the projection of the second high contrast image (e.g., in response to receiving the projection of the second high contrast image), adjusting a position (e.g., a lateral position and/or a vertical position) of the second Fresnel lens based on the projection of the second high contrast image (e.g., moving the second Fresnel lens toward a left side).

In some embodiments, the projection of the first high contrast image is received with one of a left eye and a right eye; and the projection of the second high contrast image is received with the other of the left eye and the right eye (e.g., projected image 170-1 is received with left eye 140-1 and projected image 170-2 is received with right eye 140-2).

In some embodiments, the position of the first Fresnel lens and the position of the second Fresnel lens are concurrently adjusted (e.g., the first Fresnel lens and the second Fresnel lens are concurrently moved laterally). In some cases, first Fresnel lens and the second Fresnel lens are concurrently moved in a same direction or in opposite directions. In some cases, first Fresnel lens and the second Fresnel lens are concurrently moved in directions independent of each other.

In some embodiments, the method further includes continuing to monitor the projection of the first high contrast image and adjust a position of the first Fresnel lens (or continuing to monitor the projections of the first high contrast image and the second high contrast image and adjust positions of the first Fresnel lens and the second Fresnel lens) until the first Fresnel lens is accurately positioned (or both the first Fresnel lens and the second Fresnel lens are accurately positioned). In some embodiments, the method further includes continuing to monitor the projection of the first high contrast image and adjust a lateral position of the first Fresnel lens (or continuing to monitor the projections of the first high contrast image and the second high contrast image and adjust lateral positions of the first Fresnel lens and the second Fresnel lens) until the first Fresnel lens is accurately positioned (or both the first Fresnel lens and the second Fresnel lens are accurately positioned). In some embodiments, an accurate positioning of a Fresnel lens is indicated by an orientation (e.g., a vertical orientation) of the optical artifacts in the projected image (e.g., a direction of blurring).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    displaying a first image on one or more display screens;
    projecting the first image through a first Fresnel lens;
    receiving the projection of the first image transmitted through the first Fresnel lens; and
    in conjunction with receiving the projection of the first image, adjusting at least a vertical position of the first Fresnel lens based on the projection of the first image including moving the first Fresnel lens in a direction that is perpendicular to an optical axis of the first Fresnel lens, wherein the projection of the first image includes an extension of a spot in a first direction prior to the adjusting and the projection of the first image includes an extension of the spot in a second direction distinct from the first direction after the adjusting.

2. The method of claim 1, wherein the first Fresnel lens has multiple annular sections.

3. The method of claim 1, further comprising:
    receiving a projection of a second image transmitted through a second Fresnel lens that is distinct from the first Fresnel lens; and
    in conjunction with receiving the projection of the second image, adjusting a position of the second Fresnel lens based on the projection of the second image.

4. The method of claim 3, wherein:
    the projection of the first image is received with one of a left eye and a right eye; and
    the projection of the second image is received with the other of the left eye and the right eye.

5. The method of claim 3, wherein the position of the first Fresnel lens and the position of the second Fresnel lens are concurrently adjusted.

6. The method of claim 1, wherein:
the first image is projected through the first Fresnel lens to provide a cue for adjusting a location of the first Fresnel lens.

7. The method of claim 6, further comprising:
receiving a user input that corresponds to a request to move the first Fresnel lens laterally; and
in conjunction with receiving the user input, moving the first Fresnel lens laterally.

8. The method of claim 6, wherein:
the first image on the one or more display screens is positioned away from an optical axis of the first Fresnel lens so that the optical axis of the first Fresnel lens does not intersect the first image.

9. The method of claim 8, wherein:
the first image on the one or more display screens is positioned above or below the optical axis of the first Fresnel lens.

10. The method of claim 6, comprising:
displaying a second image that is distinct from the first image on the one or more display screens; and
projecting the second image through a second Fresnel lens.

11. The method of claim 10, wherein:
the first image is projected toward one of a left eye and a right eye; and
the second image is projected toward the other of the left eye and the right eye.

12. The method of claim 10, wherein:
the second image on the one or more display screens is positioned away from an optical axis of the second Fresnel lens so that the optical axis of the second Fresnel lens does not intersect the second image.

13. The method of claim 12, wherein:
the second image on the one or more display screens is positioned above or below the optical axis of the second Fresnel lens.

14. The method of claim 12, further comprising:
receiving a user input that corresponds to a request to change an interpupillary distance of the first Fresnel lens and the second Fresnel lens; and
in conjunction with receiving the user input, moving the first Fresnel lens and the second Fresnel lens laterally to change the interpupillary distance of the first Fresnel lens and the second Fresnel lens.

* * * * *